United States Patent
Liu (10) Patent No.: US 10,516,742 B2
(45) Date of Patent: Dec. 24, 2019

(54) ACCESS SESSION MANAGEMENT (71) Applicant: HANGZHOU H3C TECHNOLOGIES CO., LTD., Zhejiang (CN)

(72) Inventor: Mengwen Liu, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 100 days.

(21) Appl. No.: 15/127,196

(22) PCT Filed: Mar. 18, 2015

(86) PCT No.: PCT/CN2015/074490
§ 371 (c)(1),
(2) Date: Sep. 19, 2016

(87) PCT Pub. No.: WO2015/139635
PCT Pub. Date: Sep. 24, 2015

(65) Prior Publication Data
US 2017/0289259 A1 Oct. 5, 2017

(30) Foreign Application Priority Data
Mar. 19, 2014 (CN) .......................... 2014 1 0103089

(51) Int. Cl.
*G06F 15/173* (2006.01)
*H04L 29/08* (2006.01)
(Continued)

(52) U.S. Cl.
CPC .............. *H04L 67/14* (2013.01); *G06F 21/10* (2013.01); *H04L 41/0253* (2013.01); *H04L 41/28* (2013.01); *H04L 63/102* (2013.01)

(58) Field of Classification Search
CPC ......... H04L 63/20; H04L 67/04; H04L 67/42; H04L 41/0253; H04L 41/0803;
(Continued)

(56) References Cited

U.S. PATENT DOCUMENTS

| | | | |
|---|---|---|---|
| 7,107,348 B2 * | 9/2006 | Shimada | H04L 29/06 709/227 |
| 9,015,328 B2 * | 4/2015 | Scavo | H04L 29/06 709/227 |

(Continued)

FOREIGN PATENT DOCUMENTS

| | | |
|---|---|---|
| CN | 101400171 A | 4/2009 |
| CN | 102362270 A | 2/2012 |
| CN | 102681836 A | 9/2012 |

OTHER PUBLICATIONS

International Search Report and Written Opinion, International Application No. PCT/CN2015/074490, dated Mar. 18, 2015, pp. 1-9, SIPO.

*Primary Examiner* — Chirag R Patel
*Assistant Examiner* — Rachel J Hackenberg
(74) *Attorney, Agent, or Firm* — Park, Vaughan, Fleming & Dowler LLP (57) ABSTRACT

A method includes the following: creating trunk status data for each user account, in response to detecting a plurality of concurrent access sessions relating to a single user account, creating respective branch status data for each access session; updating the branch status data in accordance with user access operations; and when an access session relating to a user account ends, updating the trunk status data for said user account based on a comparison of the branch status data of the access session which has ended with the trunk status data for said user account.

19 Claims, 6 Drawing Sheets

(51) Int. Cl.
*H04L 12/24* (2006.01)
*G06F 21/10* (2013.01)
*H04L 29/06* (2006.01)

(58) Field of Classification Search
CPC . H04L 41/5041; H04L 65/1063; H04L 67/14; H04L 63/128; G06F 21/10
See application file for complete search history.

(56) References Cited

U.S. PATENT DOCUMENTS

| | | | |
|---|---|---|---|
| 9,473,372 B1* | 10/2016 | Grammel | H04L 43/0811 |
| 9,517,410 B2* | 12/2016 | Ahiska | H04L 67/2852 |
| 2003/0217135 A1* | 11/2003 | Chatani | H04L 67/104 709/223 |
| 2005/0267895 A1* | 12/2005 | Yoshiuchi | H04L 29/06027 |
| 2010/0241718 A1 | 9/2010 | Rasmussen et al. | |
| 2013/0198818 A1 | 8/2013 | Hitchcock et al. | |
| 2014/0053227 A1* | 2/2014 | Ruppin | G06F 21/10 726/1 |

* cited by examiner

ACCESS SESSION MANAGEMENT

BACKGROUND

In a network management system with a web-based interface, one or more users may login the system with the same account to perform network management operations. Furthermore, users may login into a user account by using different browsers or different terminal devices, such as PC, pad, and smart phones.

DETAILED DESCRIPTION

It is possible for a user to login to a single user account of a network management system concurrently with two or more different terminal devices or different browsers. One method of handling this is for the network management system to store a single set of status data for all of the concurrent access sessions. The status data is then updated according to user actions in each concurrent access session. However, this may lead to poor user experience.

For example, if a user logs into a first access session with a first terminal device and opens an application window and sets a new desktop background, then the application window and new desktop background will be applied to any other concurrent access sessions on the same user account. However, the application window and new desktop background may not be appropriate for other access sessions, especially if the other access session is running on a different type of terminal device or different internet browser. Further, as the single set of status data is used by all concurrent access sessions, it may become a bottle neck if multiple processes attempt to access it concurrently and this may lead to a deterioration in system performance.

Another approach is to set a respective status data set for each access session, where a plurality of concurrent access sessions relate to the same account. However, as each access sessions uses its own corresponding status data set, user preferences cannot be realized when the user access the Web applications using another computing device or another browser. Thus the user has to configure the preferences again for each access session. Further, this approach may result in large amounts of status data, as each new access session has its own status data. The size of allowed cookies or other browser persistence data thus limits this approach.

In an example according to the present disclosure, a respective branch status data is created for each access session in response to detecting a plurality of concurrent access sessions relating to a single user account. In this way the concurrent access sessions may be kept independent from each other. The branch status data of an access session may be updated in accordance with operations of the user in that access session. In this way the status data of other concurrent access sessions is not impacted.

After a life cycle of each access session ends, the trunk status data is updated in accordance with the branch status data set off the access session which has ended. For example, the branch status data may be merged with the trunk status data. In this way user preferences may be maintained, while reducing the amount of persistent data as the branch status data for each individual access session is not indefinitely stored separately. In this way the buffer space may be reduced and more easily estimated and managed. Further, as each access session has different branch status data for the duration of the access session, resource contention may be avoided.

In an example, the status data may include the applications on the desktop, the applications that can be accessed by shortcuts, the background on the desktop, the applications being executed, the location/dimension of the window, or the stacking sequence of the windows. These status data are needed for daily operations of the network management system. In addition, the network management system may include network topology diagram, the formality of the web pages of the network management system that can be customized, and preference configurations of the theme of the network management system. In order to support the routine operations of the access sessions, the network management system needs to track and record the status data of current access sessions, and to use and store the status data when needed.

Figure 1:
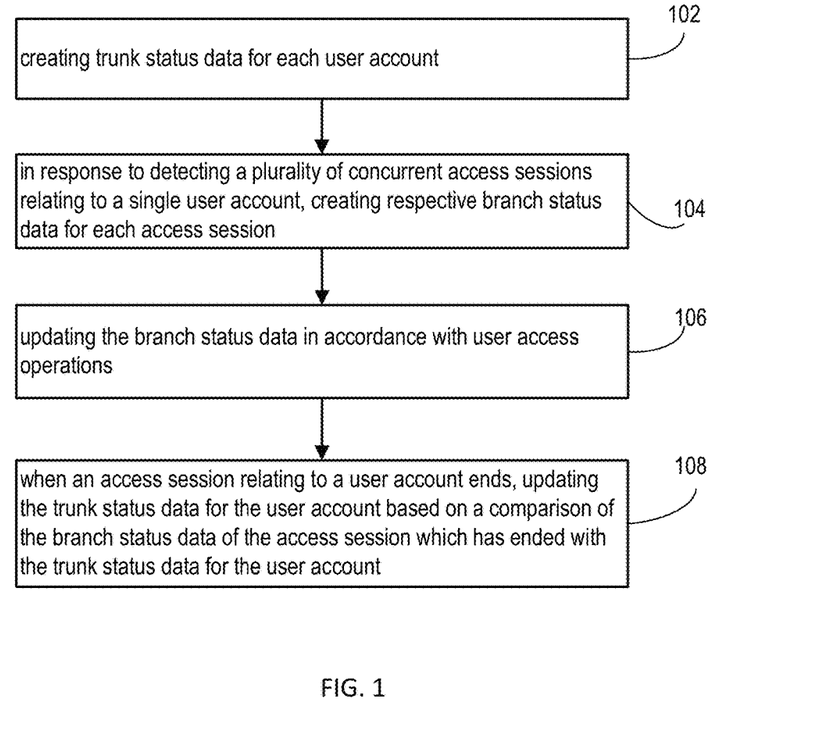
FIG. 1 is an example flowchart of the access session management method according to the present disclosure.

As shown in FIG. 1, the method of access session management according to an example of the present disclosure including the blocks below:

At block 102, creating trunk status data for each user account;

At block 104, in response to detecting a plurality of concurrent access sessions relating to a single user account, creating respective branch status data for each access session;

At block 106, updating the branch status data in accordance with user access operations; and At block 108, when an access session relating to a user account ends, updating the trunk status data for said user account based on a comparison of the branch status data of the access session which has ended with the trunk status data for said user account.

Figure 2:
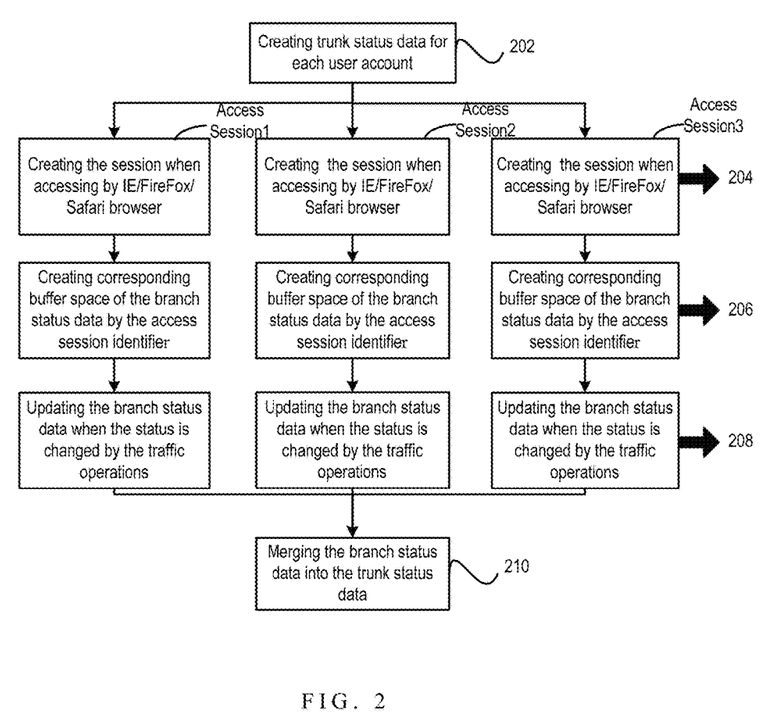
FIG. 2 is an example flowchart of the status data management for a plurality of concurrent accesses according to the present disclosure.

FIG. 2 is an example flowchart of the status data management for a plurality of concurrent accesses according to the present disclosure. The flowchart mainly includes three phases.

The first phase, as shown at block 202, a trunk status data is created, namely, the network management system may create status data for each of the user account.

The second phase is shown as block 204. After receiving the request for creating the access session, the network management system may determine the corresponding user account. The network management system then creates and configures an access sessions in accordance with the trunk status data set.

For instance, FIG. 2 shows access sessions 1, 2, and 3 respectively created by IE, Firefox, and Safari browsers.

In this example, an unique identifier may be generated for each of the access sessions. For instance, the unique identifier may be one of the account information, the source IP address of the terminal device requesting the access, the unique information of accessing media device, such as the MAC address or the fingerprint information of a accessing media device, and the user agent property of the browser or the combination thereof.

At block 206, the corresponding branch status data for each of the access sessions is created for storing the branch status data of each access sessions.

In an example, a corresponding buffer space may be created for each access sessions, which may be distinguished from each other by the unique identifier, to store the branch status data of each access sessions. During normal operation of an access sessions, the branch status data may be independently updated and managed. All of the changes resulting from the user operations may be stored in the branch status data.

At block 208, for each of the access sessions, the status data changed by the users operations may be updated to the corresponding branch status data. In addition, the server may generate the responses in accordance with the changed branch status data and then the responses are transmitted to the terminal devices.

Thus, the corresponding status data for each of the access sessions are independently updated and managed such that the users operations of each of the access sessions may not affect others.

The third phase relates to merging the branch status data set to the trunk status data set. As shown in FIG. 2, at block 210, when an access session relating to a user account ends, the network management system may update the trunk status data for said user account based on a comparison of the branch status data of the access session which has ended with the trunk status data for said user account, and then merge the differentiated branch status data into the trunk status data according to different adopted strategy.

Figure 3:
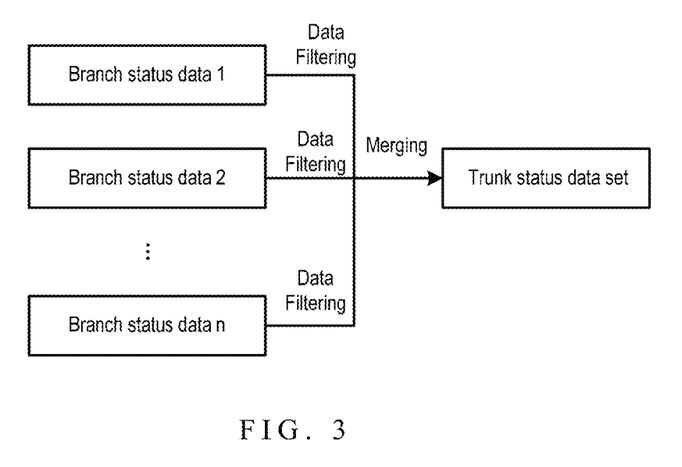
FIG. 3 is a schematic view of an example merge of the branch status data into the master status data according to the present disclosure.

As shown in FIG. 3, a plurality of branch status data, such as branch status data 1~n respectively correspond to the concurrent access sessions under the same account. The branch status data 1 will be taken as an example to illustrate how the branch status data set is merged into the trunk status data set.

In the example, the branch status data corresponding to an access session may include dynamic traffic data and application status data. The dynamic traffic data relates to dynamically changed traffic data, such as connection status of each network node or the transmitted/received data. When the user select a different browser or terminal device to execute the corresponding access sessions, it is not needed to review the historical dynamic traffic data. Instead, it is needed to update the dynamic traffic data in real time. The application status data may include the information, such as which applications are on the desktop, which applications can be accessed by shortcuts, the background on the desktop, the applications being executed, the location/dimension of the window, or the stacking sequence of the windows. The above-mentioned application status data generally represent the user operations habits that should be shared for each of the access sessions.

Thus, after the life cycle of an access session ends, the dynamic traffic data and the application status data are isolated from each other. The dynamic traffic data is deleted, and then the remaining application status data is compared with the trunk status data set so as to update the master status data. In this way, the branch status data 1 is merged with the master status data.

It can be understood that different branch status data relate to different traffic functions, which may include different dynamic traffic data and application status data. In other examples, an adopted strategy may be predetermined for each of the traffic functions. That is, each of the traffic functions corresponds to its dynamic traffic data and application status data. As such, each of the branch status data may be precisely filtered when the branch status data is merged with the trunk status data.

In addition, if there is a concurrent access operation relating to the same status data, the corresponding branch status data may be merged with the trunk status data according to one of the policies: 1) defining a predetermined priority level for each of the access sessions, and merging the corresponding branch status data of the access session with the highest priority level with the master status data; 2) merging the corresponding branch status data of operations scheduled to be execute first or last with the trunk status data in accordance with the sequence of the executed access operations; 3) merging the corresponding branch status data of the access session executed last with the trunk status data in accordance with the ending of corresponding access sessions.

As the concurrent login with one user account may cause risk, to improve the safety of the account, an account safety management method will be described hereinafter with an example user account A.

Figure 4:
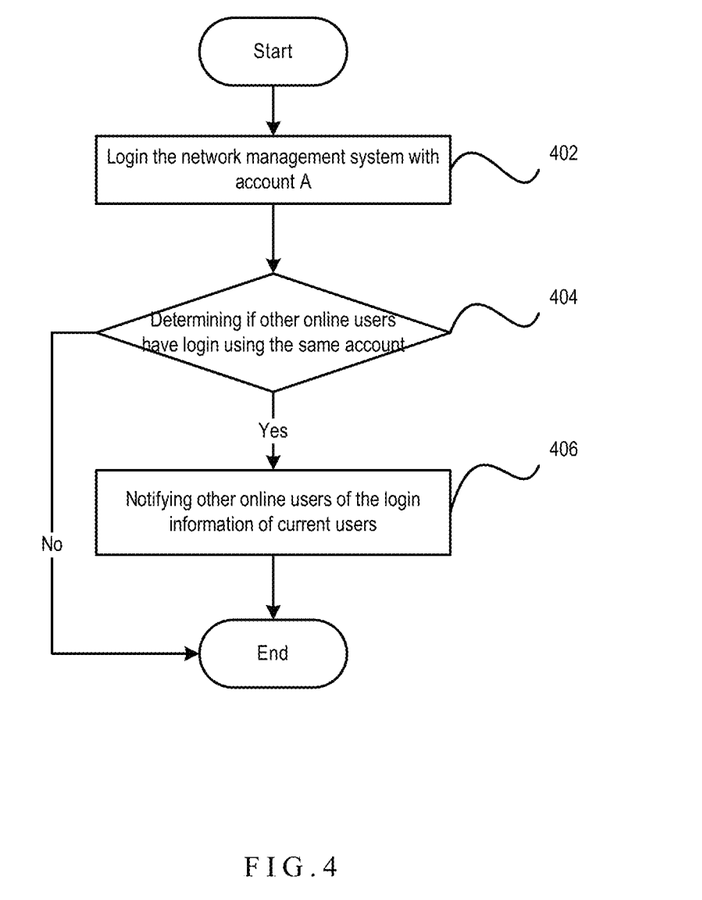
FIG. 4 is a schematic view of the message notification mechanism when a plurality of users performs the login according to the present disclosure.

FIG. 4 is a schematic view of the message notification mechanism when a plurality of users login with the account A at the same time.

At block 402, the access session is created when any one of the users login the network management system with the user account A. In addition, the channel is registered and monitored.

At block 404, the network management system determines if there are other users have login the system with the user account A.

At block 406, when there are more than one user login the system with the user account A, the network management system may obtain the unique identifier for the corresponding access sessions.

The unique identifier may be generated for each of the access sessions. For instance, the unique identifier may be one of the account information, the source IP address requesting the access, the access media, and the user agent property of the browser or the combination thereof.

By notifying the login details to other online users, each of the users may precisely be aware of other concurrent user so as to timely find the account stolen, which can enhance the safety of the account.

In addition, other online users are also informed with the access operations, such as the targets or the processes, execute by the corresponding access sessions. In this way, each of the users is capable of determining whether the account has been illegally login basing on the access operation information.

Furthermore, the access sessions with the same unique identifier may be configured with different priority level. In this way, when the corresponding access operation of an access session has been determined to have the potential safety risk, the access session with higher priority level is allowed to refuse the execution of the access operations corresponding to the access sessions with lower priority level or to avoid the merge of the branch status data with the master status data so as to enhance the safety.

Figure 5:
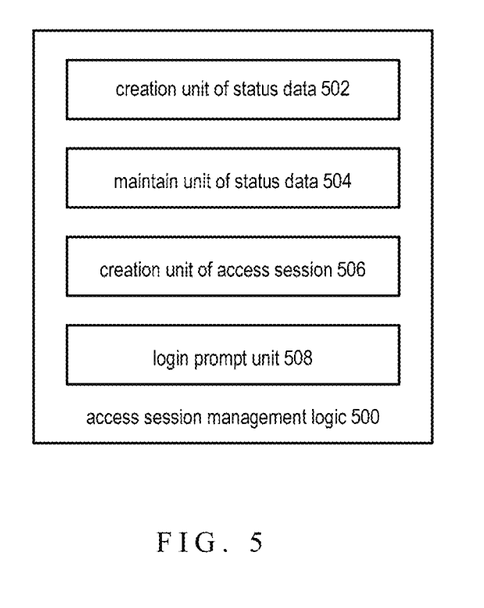
FIG. 5 is a block diagram of an example access session management logic according to the present disclosure.

FIG. 5 is a block diagram of an example access session management logic. The access session management logic includes a creation unit of status data 502, a maintain unit of status data 504, a creation unit of access session 506, and a login prompt unit 508.

The creation unit of status data 502 is for creating trunk status data for each user account. Also, in response to detecting a plurality of concurrent access sessions relating to a single user account, the creation unit of status data 502 may create respective branch status data for each access session.

The maintain unit of status data 504 is for updating the corresponding branch status data in accordance with the user operations. In addition, the maintain unit of status data 504 is for updating the trunk status data for said user account based on a comparison of the branch status data of the access session which has ended with the trunk status data for said user account so as to maintain the trunk status data after a life cycle of each access session ends.

The creation unit of access session 506 is for determining the corresponding user account and for creating the access session according to the user account after receiving the request for creating the access session. Additionally, the creation unit of access session 506 may also create and configure an access sessions in accordance with the trunk status data of the user account.

The login prompt unit 508 is for obtaining the unique identifier of the access sessions upon detecting a user has login the system. In addition, the login prompt unit 508 may send the unique identifier of the access sessions to other online users with the same user account.

The unique identifier may be generated for each of the access sessions. For instance, the unique identifier may be one of the account information, the source IP address requesting the access, the access media, and the user agent property of the browser or the combination thereof.

In addition, the branch status data may include the dynamic traffic data and the application status data.

The maintain unit of status data 504 is for filtering the dynamic traffic data within the corresponding branch status data set, and for maintaining the trunk status data set in accordance with the remaining application status data.

Figure 6:
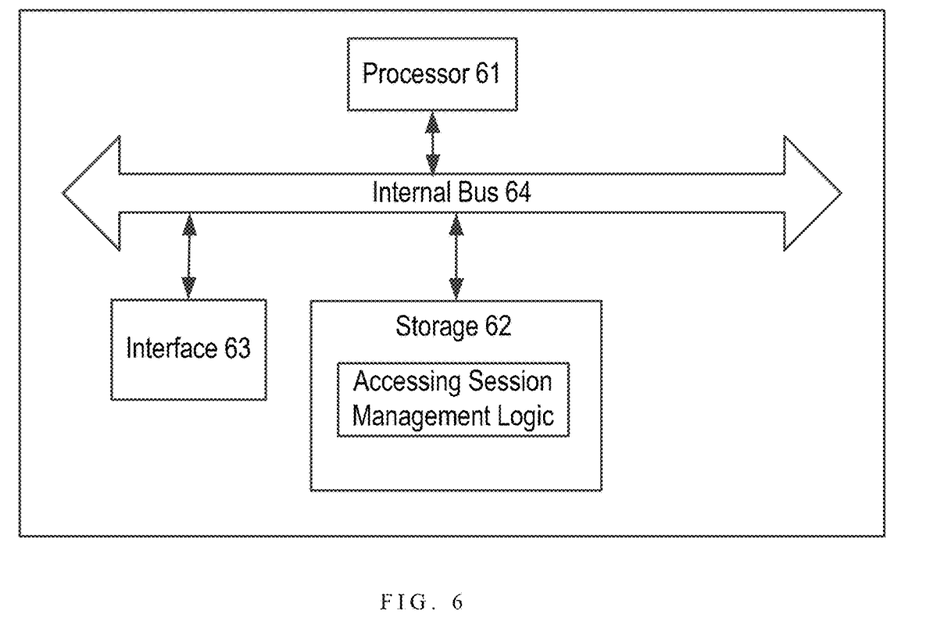
FIG. 6 is a block diagram of an example network management server for access session management according to the present disclosure.

FIG. 6 is a block diagram of an example network management server for access session management.

The network management server includes a processor 61, a storage 62, an interface 63, and an internal bus 64. The processor 61, the storage 62, and the interface 63 are connected via the internal bus 64. In an example, the access session management logic is implemented by an instruction set, i.e., machine-readable instructions which are stored in the storage. The processor 61 may read the machine readable instructions from the storage 62 and then execute the logic described hereinafter.

An trunk status data set is created for each user account. In addition, in response to detecting a plurality of concurrent access sessions relating to a single user account, the branch status data is created for each access session respectively.

The branch status data corresponding to the user account is updated in accordance with the user's access operations. In addition, when an access session relating to a user account ends, updating the trunk status data for said user account based on a comparison of the branch status data of the access session which has ended with the trunk status data for said user account.

The processor may read the machine readable instructions and execute the access session management logic described hereinafter.

After receiving the request for creating the access session, the network management system may determine the corresponding user account. The network management system then creates and configures an access sessions in accordance with the trunk status data of the determined user account.

The branch status data corresponding to each of the access sessions may include dynamic traffic data and application status data. The processor also reads the machine readable instructions to execute the process below:

After the life cycle of the access session ends, the dynamic traffic data and the application status data of the access session are isolated from each other. The dynamic traffic data is deleted, and then the remaining application status data is compared with the trunk status data set so as to update the master status data.

The unique identifier of the access sessions is obtained upon detecting any one of the users has login the system, and the unique identifier of the access sessions is sent to other online users with the same user account.

Thus, the branch status data corresponding to each of the access sessions and the trunk status data of each user account are maintained in an unified way. This ensures the independency and consistency of the status data between each access sessions.

The foregoing descriptions are only examples of the present disclosure and are not for use in limiting the protection scope thereof. Any modification, equivalent replacement and improvement made under the spirit and principle of the present disclosure should be included in the protection scope thereof.

The invention claimed is:

1. An access session management method, comprising:
   creating trunk status data for each user account;
   in response to detecting a plurality of concurrent access sessions associated with a single user account occurring on different terminal devices, creating respective branch status data for each of the access sessions;
   updating the branch status data for a respective access session in accordance with user access operations in the respective access session; and
   subsequent to ending of one or more access sessions of the concurrent access sessions, merging branch status data associated with the ended access sessions with the trunk status data, wherein merging the branch status data with the trunk status data comprises:
   in response to detecting access operations from different concurrent access sessions affecting a same set of status data within the trunk status data, selecting, from the different concurrent access sessions, an access session based on a predetermined merging policy; and
   updating the trunk status data based on branch status data from the selected access session.

2. The access session management method as claimed in claim 1, wherein after a request for creating the access session is received, the method further comprises:
   determining the corresponding user account; and
   creating and configuring an access session in accordance with the trunk status data of the user account.

3. The access session management method as claimed in claim 1, wherein the branch status data comprises dynamic traffic data and application status data, and wherein after each access session ends, the dynamic traffic data of the branch status data is deleted, and the trunk status data is updated in accordance with the application status data.

4. The access session management method as claimed in claim 1, the method further comprises:

obtaining an unique identifier for each access session upon detecting a login operation executed by a user; and sending the unique identifier to other access sessions belonging to the same user account.

5. The access session management method as claimed in claim 4, wherein the unique identifier includes at least one of account information, an IP address of terminal devices, the access media, and the user agent property of the browser.

6. The access session management method of claim 1, wherein each single user account is for access to a network management system.

7. The access session management method of claim 1, wherein the concurrent access sessions are for the same application.

8. The access session management method of claim 1, wherein the predetermined merging policy comprises a priority-level-based policy, and wherein an access session having a highest priority level is selected.

9. The access session management method of claim 1, wherein the predetermined merging policy comprises a session-sequence-based policy, and wherein an access session that is executed last is selected.

10. The access session management method of claim 1, wherein the predetermined merging policy comprises an operation-sequence-based policy, and wherein an access session is selected based on a sequence of operations affecting the same set of status data.

11. A non-transitory computer readable storage medium on which is stored machine readable instructions that when executed by a processor cause the processor to:

create trunk status data for each user account;

in response to detecting a plurality of concurrent access sessions associated with a single user account occurring on different terminal devices, create respective branch status data for each of the access sessions;

update the branch status data for a respective access session in accordance with user access operations in the respective access session; and subsequent to ending of one or more access sessions of the concurrent access sessions, merge branch status data associated with the ended access sessions with the trunk status data, wherein merging the branch status data with the trunk status data comprises:

in response to detecting access operations from different concurrent access sessions affecting a same set of status data of the trunk status data, selecting, from the different concurrent access sessions, an access session based on a predetermined merging policy; and updating the trunk status data based on branch status data from the selected access session.

12. The non-transitory computer readable storage medium according to claim 11, wherein after a request for creating the access session is received, the machine readable instructions are further to cause the processor to:

determine the corresponding user account; and create and configuring an access session in accordance with the trunk status data set of the user account.

13. The non-transitory computer readable storage medium according to claim 11, wherein the branch status data comprises dynamic traffic data and application status data, the machine readable instructions are further to cause the processor to:

delete the dynamic traffic data of the branch status data after each access session ends, and update the trunk status data in accordance with the application status data.

14. The non-transitory computer readable storage medium according to claim 11, wherein the machine readable instructions are further to cause the processor to:

obtain an unique identifier for each access session upon detecting a login operation executed by a user; and send the unique identifier to other access sessions belonging to the same user account.

15. The non-transitory machine-readable storage medium as claimed in claim 14, wherein the unique identifier includes at least one of account information, an IP address of terminal devices, the access media, and the user agent property of the browser.

16. The non-transitory machine-readable storage medium of claim 11, wherein the concurrent access sessions are for the same application.

17. The non-transitory machine-readable storage medium of claim 11, wherein the predetermined merging policy comprises a priority-level-based policy, and wherein an access session having a highest priority level is selected.

18. The non-transitory machine-readable storage medium of claim 11, wherein the predetermined merging policy comprises a session-sequence-based policy, and wherein an access session that is executed last is selected.

19. The non-transitory machine-readable storage medium of claim 11, wherein the predetermined merging policy comprises an operation-sequence-based policy, and wherein an access session is selected based on a sequence of operations affecting the same set of status data.

* * * * *